United States Patent [19]

Uchida et al.

[11] Patent Number: 4,678,314
[45] Date of Patent: Jul. 7, 1987

[54] IMAGE FORMING APPARATUS

[75] Inventors: Kohachi Uchida, Sagamihara; Kunihiro Shibuya, Yokohama; Hajime Nakamura, Tokyo, all of Japan

[73] Assignee: Kabushiki Kaisha Toshiba, Kawasaki, Japan

[21] Appl. No.: 777,447

[22] Filed: Sep. 18, 1985

[30] Foreign Application Priority Data

Oct. 3, 1984 [JP] Japan ................... 59-208587

[51] Int. Cl.$^4$ ........................................... G03G 15/00
[52] U.S. Cl. .................................... 355/5; 355/14 D; 355/14 TR
[58] Field of Search ............... 355/3 R, 3 DD, 5, 44, 355/14 R, 14 D, 14 TR

[56] References Cited

U.S. PATENT DOCUMENTS 3,674,354  7/1972  Artaud et al. .................... 355/5
4,341,463  7/1982  Kashiwagi et al. ............... 355/5 X Primary Examiner—Arthur T. Grimley
Assistant Examiner—J. Pendegrass
Attorney, Agent, or Firm—Schwartz, Jeffery, Schwaab, Mack, Blumenthal & Evans

[57] ABSTRACT

A microfilm reader printer has a reader unit which projects a microfilm image onto a screen and a printer unit which reproduces copies of the microfilm image. The printer unit has an optical device for forming an electrostatic image on a photoreceptor by exposing the microfilm image onto the photoreceptor and a developing device for visualizing the electrostatic latent image formed on the photoreceptor. The developing device has a first developing unit for achieving direct development, a second developing unit for achieving reversal development and driving device for activating one of the developing units. A positive copy may be reproduced from both positive and negative types of a microfilm by selectively operating one of the developing units.

4 Claims, 15 Drawing Figures

FIG./.

IMAGE FORMING APPARATUS

BACKGROUND OF THE INVENTION

This invention relates to an image forming apparatus, more specifically, the invention relates to an apparatus for reproducing a copy image according to either a positive original image or a negative original image.

As an example of such an apparatus, there is known a microfilm reader printer which may project a reduced image recorded on a microfilm onto a screen and also reproduce copies of the microfilm image if desired. Microfilms have been extensively used for storing and retrieving image information. Generally, the images recorded on microfilms are roughly classified into two categories, i.e., positive images and negative images which are selected according to a type of an original image. Therefore, two types of developing devices are necessary in order to reproduce a copy image from these two different kinds of microfilm images in conformity with the condition of the recorded image. To meet this requirement, a developing device for reproducing a positive copy image from a positive microfilm image and another developing device for reproducing a positive copy image from a negative microfilm image are prepared and only one of these developing devices is mounted on the microfilm reader printer according to the kind of microfilm images. It is, however, necessary to replace the developing device each time the kind of image to be developed is changed. The operation of replacing the developing device takes some time and requires a great deal of effort. This system, therefore, is inferior in view of its cumbersome operability.

SUMMARY OF THE INVENTION

Accordingly, it is an object of the present invention to provide an image forming apparatus which may reproduce a positive copy image from either a positive or negative original image.

Another object of the present invention is to provide an image forming apparatus which is convenient to use and operate.

These and other objects of the invention are achieved by providing an improved image forming apparatus including first means for forming a copy image of a positive type from an original image of a negative type, second means for forming a copy image of a positive type from an original image of a positive type, and means for selectively energizing one of the first and second image forming means so as to form the copy image.

BRIEF DESCRIPTION OF THE DRAWINGS

These and other objects and advantages of the invention will become more apparent and more readily appreciated from the following detailed description of the preferred embodiments of the invention taken in conjunction with the accompanying drawings, of which.

DETAILED DESCRIPTION OF THE PREFERRED EMBODIMENTS

Figure 1:
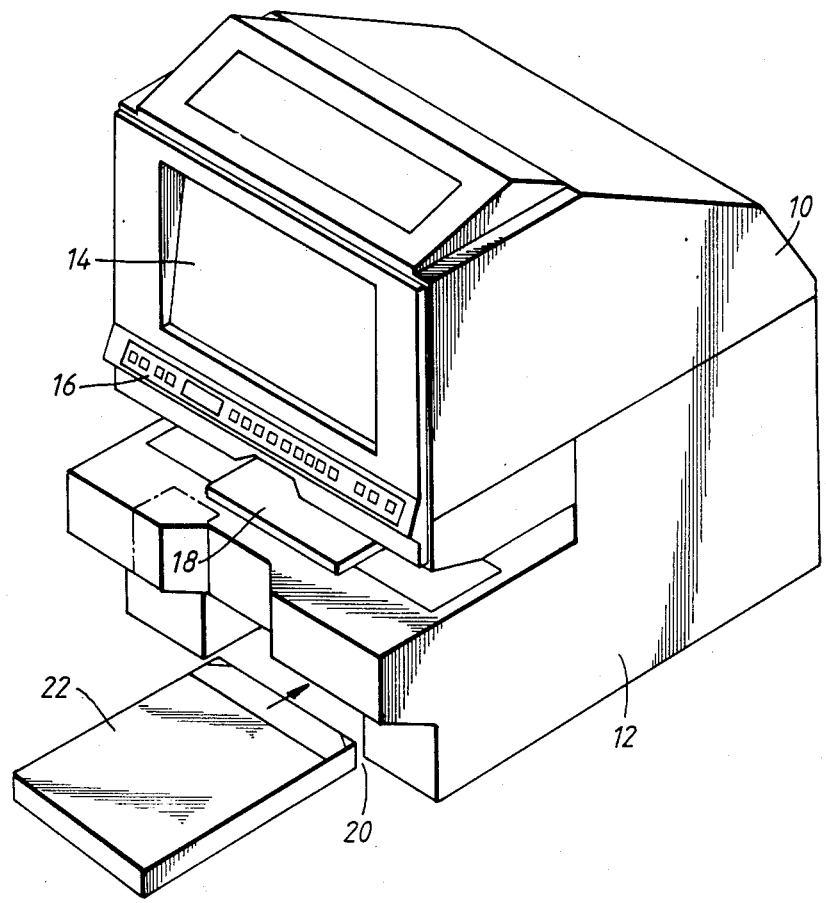
FIG. 1 is a perspective view of a microfilm reader printer according to the present invention.

FIG. 1 shows a microfilm reader printer as an embodiment of an image forming apparatus utilizing electrophotography according to the present invention.

APPEARANCE

Referring now to FIG. 1, the microfilm reader printer comprises a reader unit 10 and a printer unit 12. On reader unit 10, there is provided a screen 14 for displaying a magnified image according to an original image recorded on a microfilm, an operation panel 16 for instructing machine operation and displaying operational conditions, and a retainer 18 for supporting the microfilm thereon. Printer unit 12 is provided with an access portion 20 where a cassette 22 may be installed into and removed from the front side of the apparatus. Cassette 22 accommodates copy sheets. The copy sheet with a copy image thereon is also discharged to access portion 20. Thus, the operations of projecting and printing the microfilm image may be achieved on the front side of the apparatus.

READER UNIT

Figure 2:
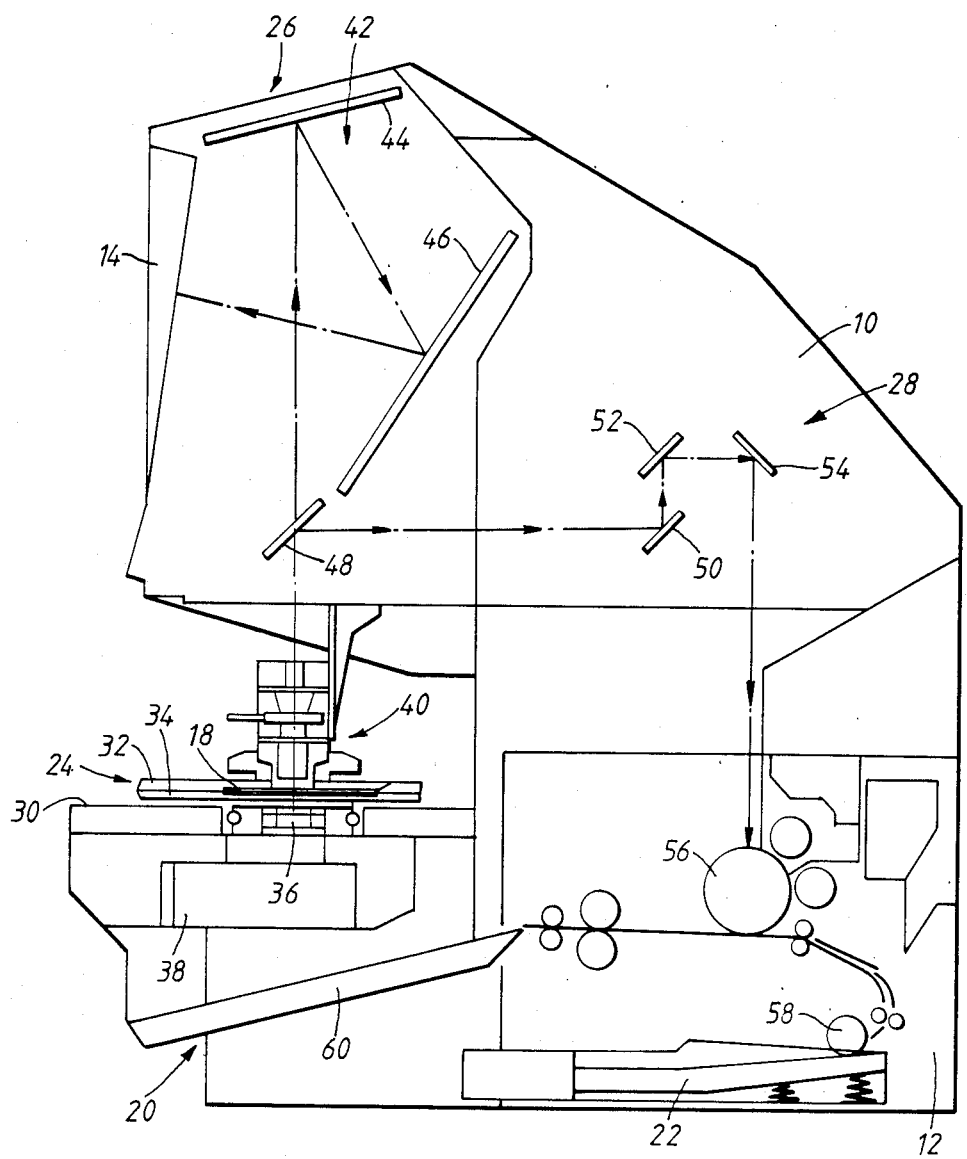
FIG. 2 is a schematic view of the inside of the microfilm reader printer.

Referring now to FIG. 2, there is shown the inside of the apparatus. Reader unit 10 is provided with a film supporting unit 24 for establishing the position of the microfilm, a projecting unit 26 for projecting the microfilm image onto screen 14 and a scanning unit 28 for scanning the microfilm image.

Film supporting unit 24 is provided on a table 30. On table 30, retainer 18 having transparent plates 32 and 34 is movably arranged so that the microfilm held between transparent plates 32 and 34 may be located at a desired position. Beneath table 30, a condenser lens 36 and a light source 38 are provided. The above-mentioned components, i.e., retainer 18, table 30, transparent plates 32 and 34, condenser lens 36 and light source 38 define the film supporting unit 24. A light from source 38 is condensed through lens 36 to illuminate the microfilm supported between plates 32 and 34. When light source 38 is left in the energized condition for a long time period, it is automaticaly turned off in order to increase the life of light source 38. Microfilm retainer 18 may be movable longitudinally and transversally in a plane above condenser lens 36. Thus, the desired original image may be located at any desired position above condenser lens 36 by moving retainer 18. When a microfilm in the form of a roll is used for the apparatus, microfilm retainer 18 and associated units may be replaced to accommodate same so that various forms of microfilm supports may be used.

Projecting unit 26 includes a lens holder 40 for adjusting the focus and rotational angle of the image projected onto screen 14 and a light guide unit 42 for displaying a projected image on screen 14 according to the projected light incident from lens holder 40. This light guide unit 42 is provided with mirror 44 and 46 for directing the projected light from lens holder 40 to screen 14.

Scanning unit 28 includes a rotatable mirror 48 for scanning the projected image and directing the projected light to either projecting unit 26 or scanning unit 28. Scanning unit 28 further includes mirrors 50, 52 and 54 for guiding the scanning light reflected by rotatable mirror 48 to printer unit 12. Rotatable mirror 48 is disposed so that it may reciprocate in the perpendicular direction to the plane in FIG. 2 and rotate about the perpendicular axis to the plane in FIG. 2. Therefore, rotatable mirror 48 is held at a position far from lens holder 40 so as not to block the projected light while the projected light from lens holder 40 is guided onto screen 14. When the copying operation is desired, rotatable mirror 48 is moved to a position above lens holder 40 and rotated so that the projected light from lens holder 40 is reflected to mirror 50 and scanned to reproduce a copy. This rotatable mirror 48 is driven for the reciprocating movement by a motor (not shown).

Printer unit 12 is provided with a rotating drum 56 having a photorecrptor such as Se thereon. The reflected light from mirror 54 is directed to the surface of drum 56 so that an electrostatic latent image according to the microfilm image is formed on the surface of drum 56 by exposure of the light image reflected from mirror 54. In printer unit 12, there is provided a feeding roller 58 for feeding copy paper from cassette 22 and a tray 60 for receiving the copy sheet.

Figure 3:
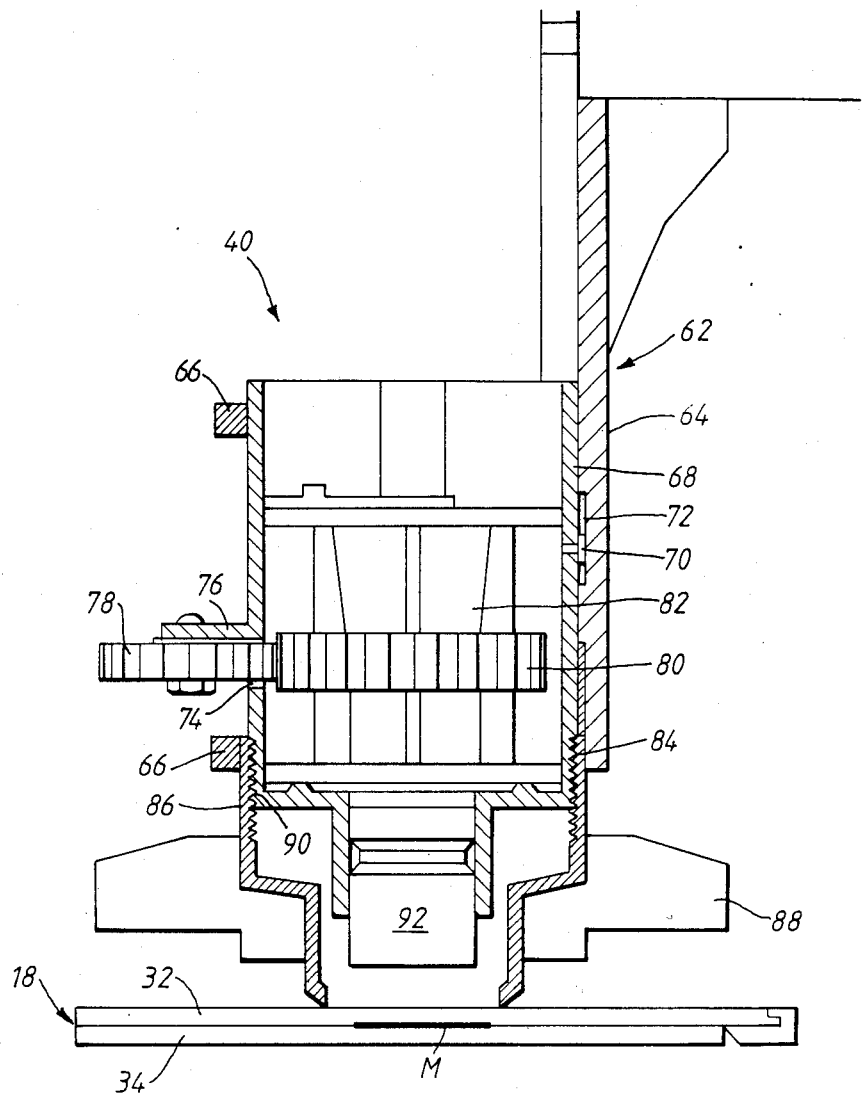
FIG. 3 is a schematic sectional view of a lens holder of the microfilm reader printer.

Referring now to FIG. 3, the detailed construction and operation of lens holder 40 will be described.

Below mirror 48, a holder 62 is attached to the front side of the apparatus. This holder 62 is in the form of a hollow cylinder and consists of two halves, i.e., a base member 64 attached to the apparatus and a cover member 66 hinged to base member 64 by hinges (not shown). In holder 62, a casing 68, which is a cylindrical member and has a projection 70, is movably disposed therein. Projection 70 is received in a guide groove 72 provided on base member 64 and serves as a stopper for preventing casing 68 from freely rotating. The peripheral wall of casing 68 is provided with an opening 74 and an outer projection 76. A gear 78 for adjusting the rotational angle of the projected image is supported by outer projection 76 and is meshed with a gear 80 through opening 74. A prism 82 is secured on the upper side of gear 80 so that prism 82 is rotated by rotating gear 78. Thus, the projected image rotates about the optical axis in accordance with the rotation of gears 78 and 80. The lower end of the outer periphery of casing 68 is formed with a thread 84. A focus adjusting member 86 formed in a stepped cylinder is coupled with the lower end of casing 68. This focus adjusting member 86 is provided with a plurality of radially spaced vane-like members 88 projecting from the outer periphery and a thread 90 formed on the inner periphery thereof. Focus adjusting member 86 is coupled with casing 68 by engaging thread 90 thereon and thread 84 of casing 68. The lower end of member 86 is held in contact with microfilm retainer 18 due to the weight of casing 68 and member 86. Thus, focus adjusting member is rotated in contact with retainer 18 by turning vane-like members 88, so that casing 68 is moved vertically in holder 62 because casing 68 is held by projection 70 and guide groove 72. Consequently, the distance between a lens 92 secured to casing 68 and retainer 18 is varied, whereby focus adjustment may be achieved. As shown in FIG. 3, the microfilm M is held between plates 32 and 34 located below lens holder 40; therefore, the light from condenser lens 36 illuminates microfilm M, and then is focused by lens 92.

Figure 4:
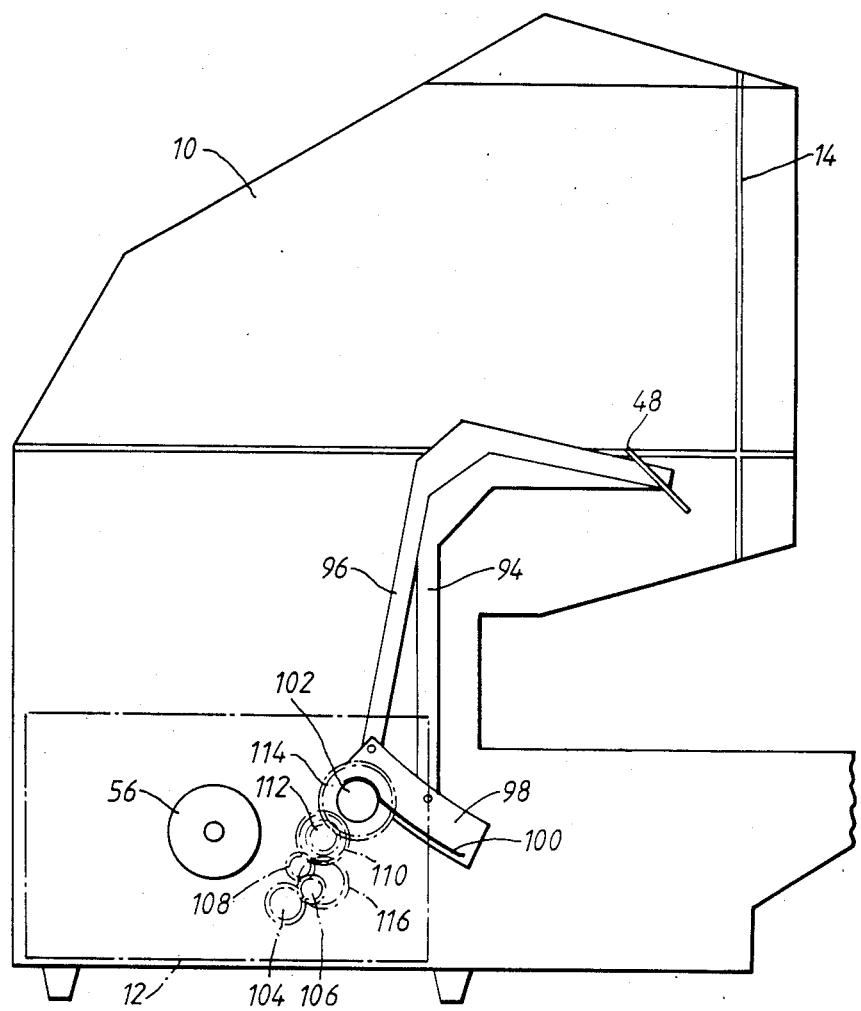
FIG. 4 is a side view for explaining the operation of a reader unit of the microfilm reader printer.

Referring now to FIG. 4, rotatable mirror 48 is attached to arms 94 and 96 which are secured on a movable member 98. One end of a steel belt 100 is secured to an end of movable member 98. The other end of steel belt 100 is secured to the periphery of a rotary shaft 102. Thus, belt 100 is wound on rotary shaft 102 when shaft 102 is driven in the counterclockwise direction. As steel belt 100 is wound up, movable member 98 is moved and this displacement is transmitted to rotatable mirror 48 through arms 94 and 96, whereby mirror 48 is driven for optically scanning. When rotary shaft 102 is rotated in the clockwise direction, steel belt 100 is let out and mirror 48 is returned to an initial state. Rotary shaft 102 is driven by a driving gear 104 through gears 106, 108, 112, 114 and 116. Gear 104 is directly coupled to a drive motor (not shown) for driving drum 56. In this arrangement, the rotation in the counterclockwise direction is achieved by gear 104, gear 106 in mesh with gear 104, gear 108 in mesh with gear 106, gear 110 in mesh with gear 108, gear 112 secured to the same shaft as gear 110, and gear 114 secured to rotary shaft 102 and in mesh with gear 112. Also, the rotation in the clockwise direction is achieved by gear 104 and gears 110, 112, 114 and 116. In this arrangement, gears 110 and 112 are moved into mesh with gear 116, so that rotary shaft 102 is is rotated in the clockwise direction due to the rotation of gear 104 in the counterclockwise direction. With the arrangement mentioned above, mirror 48 may be driven for scanning over a predetermined angle because gear 104 is coupled to the motor which drives drum 56.

PRINTER UNIT

Figure 5:
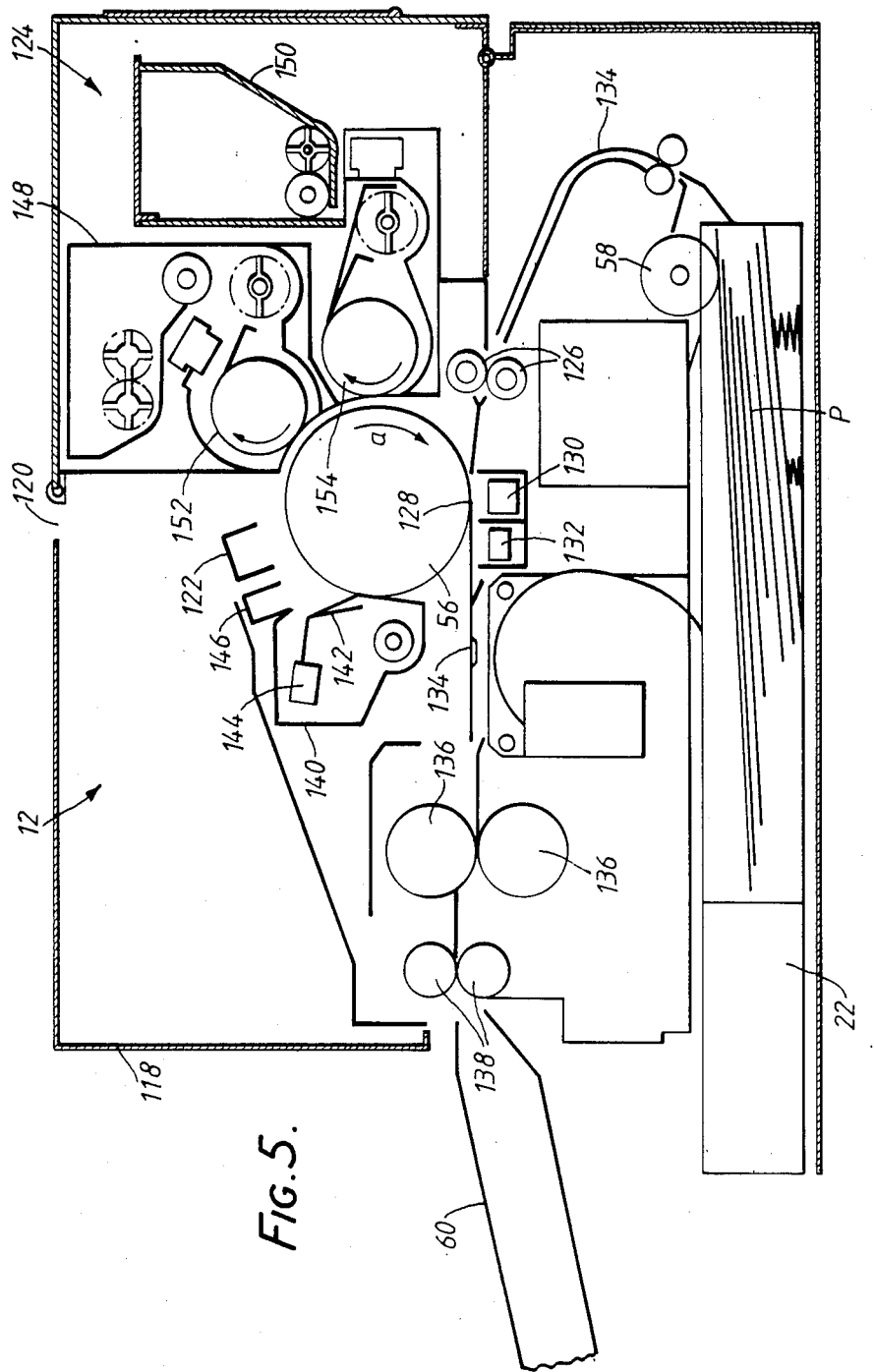
FIG. 5 is a schematic sectional view of the inside of a printer unit of the microfilm reader printer.

Referring now to FIG. 5, the the detailed construction and operation of printer unit 12 will be described. FIG. 5 shows a schematic sectional view of printer unit 12.

In a casing 118 of printer unit 12, cassette 22 is mounted wherein copy sheets P are stored. On one side of casing 118, tray 60 is provided. This tray 60 may be removed. On an upper surface of casing 118, an exposure slit 120 is provided. This slit 120 guides the light image scanned by scanning unit 28 to the surface of drum 56. This drum 56 is rotated in the direction of an arrow a in FIG. 5. By the scanning operation of scanning unit 28, the light image is projected onto the surface of drum 56, and thus an electrostatic latent image is formed thereon. The surface of drum 56 is charged previously by a corona charger 122. The electrostatic latent image is visualized by depositing toner particles at a developing device 124.

Copy sheets P in cassette 22 are taken out one-by-one by feed roller 58 and are then guided by register rollers 126 to a transferring station 128. Accordingly, as drum 56 is rotated, the toner image carried on drum 56 is transferred to copy sheet P fed from register rollers 126 at transferring station 128 by a transfer charger 130. After the toner image is transferred, copy sheet P is separated by a separation charger 132 from the surface of drum 56. After that, copy sheet P is transported by a conveyer 134 to a fixing device 136. The transferred toner image is fixed on copy sheet P by fixing device 136. Fixed copy sheet P is discharged outside casing 118 by discharge rollers 138 to be accumulated in tray 60. After transfer, residual toner particles on the surface of drum 56 are removed by a cleaner 140. This cleaner 140 is provided a elastic blade 142 for scraping off the residual toner particles and a solenoid 144 for bringing blade 142 into contact with drum 56. Also, any residual electrostatic image is discharged by an erase lamp 146, so that printer unit 12 returns to an initial state to print copy images repeatedly.

DEVELOPING DEVICE

As shown in FIG. 5, developing device 124 comprises a first developing unit 148 and a second developing unit 150 which have developing rollers 152 and 154, respectively. These developing units 148 and 150 are selectively driven so that first developing unit 148 reproduces a positive toner image from a positive latent image, and second developing unit 150 reproduces a positive toner image from a negative latent image.

Figure 6:
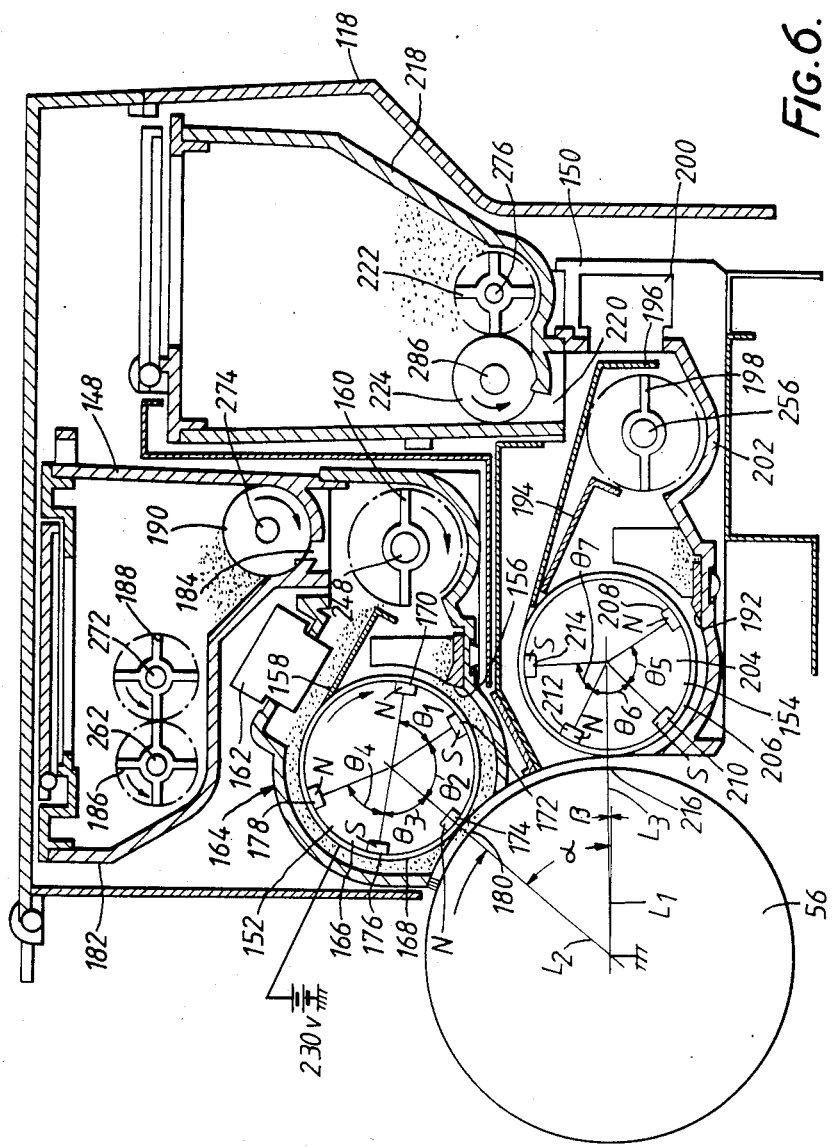
FIGS. 6 and 7 are schematic sectional views of the inside of developing devices in the printer unit.
Figure 7:
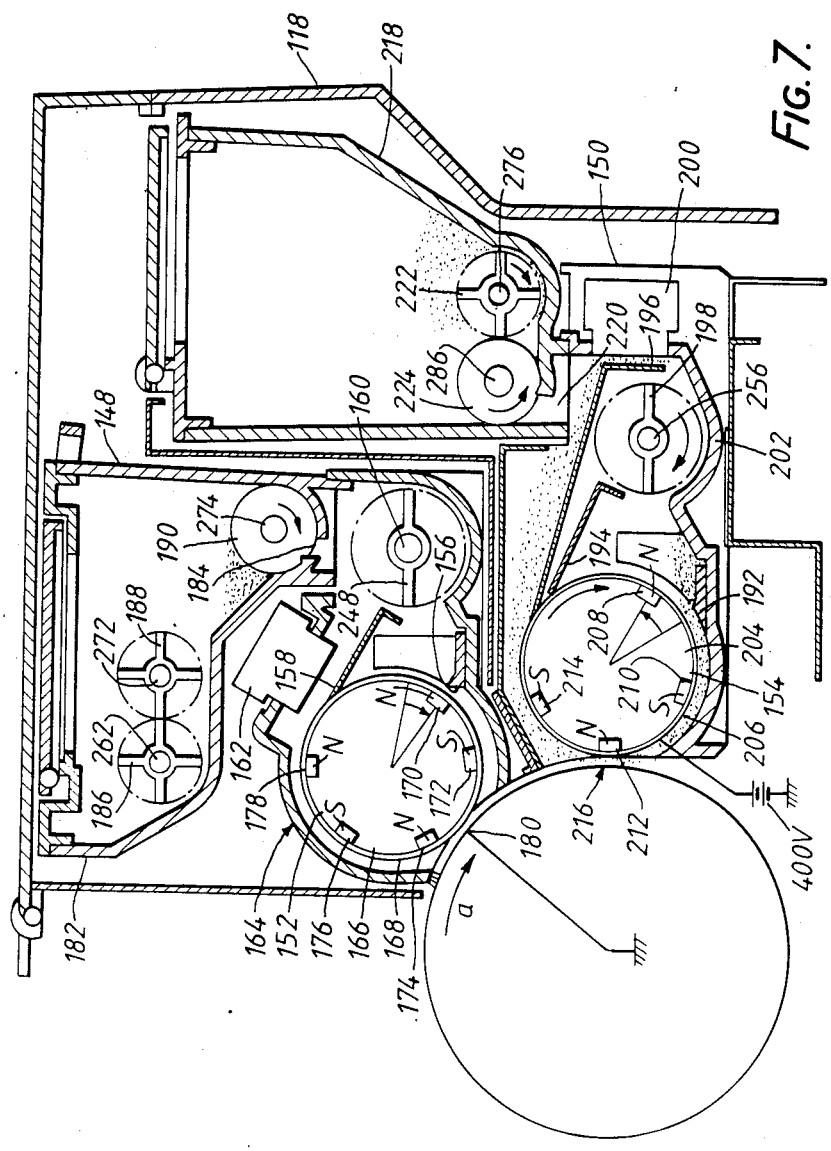

Referring now to FIGS. 6 and 7, there is shown the detailed structure of developing device 124. First developing unit 148 is provided with a doctor 156 opposed to developing roller 152 for adjusting the thickness of a developer layer formed on developing roller 152, a scraper 158 disposed on developing roller 152 for scraping off the developer layer, and a developer agitator 160. A sensor 162 is mounted on a casing 164 of unit 148 above developing roller 152. Sensor 162 detects the developer concentration in casing 164. Developing roller 152 comprises a fixed magnetic roller 166 which is located such that its center is positioned on a line $L_2$ crossing the rotative axis of drum 56 and making an angle $\alpha$ of about 15° with respect to a horizontal line $L_1$, and a cylindrical sleeve 168 made of nonmagnetic materials and surrounding magnetic roller 166. This magnetic roller 166 has five magnetic poles 170, 172, 174, 176 and 178 which are magnetized as shown in FIGS. 6 and 7 and separated radially by an angle $\theta_1$, of about 50°, an angle $\theta_2$ of about 71°, an angle $\theta_3$ of about 60° and an angle $\theta_4$ of about 60°, respectively. Sleeve 168 is rotated in the clockwise direction so that the devleoper is transported from agitator 160 to a developing position 180 by carrying the developer on the surface of sleeve 168. A hopper 182 is provided above developing roller 152. This hopper 182 accommodates toner particles and replenishes the toner through a toner outlet 184. In hopper 182, there are provided agitators 186 and 188 and a replenishing roller 190 disposed above outlet 184. Thus, the toner particles stored in hopper 182 are stirred by agitators 186 and 188 and replenished by roller 190 through outlet 184 according to the detection of sensor 162. In casing 164, the developer comprising carrier particles made of iron powder and the toner particles replenished by roller 190 are mixed so that the toner particles have a sufficient charge to be deposited on the latent image by a electrostatic force. The charged toner particles and the carrier particles are attracted to each other and are transported to developing roller 152. Developing roller 152 carries the developer comprising the carrier and toner thereon by means of the magnetic force of magnetic roller 166. By rotating sleeve 168, the developer carried on the surface of sleeve 168 is transported to developing position 180 through doctor 156 whereat the thickness of the developer supported on sleeve 168 is restricted so as to form a layer of the developer on the surface of sleeve 168. This developer layer is called a magnetic brush. Thus, the toner of the developer is transferred to the surface of drum 58 at position 180 by the electrostatic force established between the latent image and sleeve 168. After that, the magnetic brush is scraped from sleeve 168 by scraper 158 and then turned to agitator 160.

Second developing unit 150 has a similar structure and function to that of first developing unit 148. There are provided a doctor 192 opposed to developing roller 154 for adjusting the thickness of a developer layer formed on developing roller 154, scrapers 194 and 196 disposed on developing roller 154 for scraping off the developer layer, and a developer agitator 198. A sensor 200 is mounted on a casing 202 across agitator 198. This sensor 200 detects the developer concentration in accordance with the developer scraped by scraper 196. Developing roller 154 comprises a fixed magnetic roller 204 which is located such that its center is positioned on a line $L_3$ crossing the rotative axis of drum 56 and making an angle $\beta$ of about 1° with respect to the line $L_1$, and a cylindrical sleeve 206 made of nonmagnetic materials and surrounding magnetic roller 204. This magnetic roller 204 has four magnetic poles 108, 210, 212 and 214 which are magnetized as shown in FIGS. 6 and 7 and separated radially with an angle $\theta_5$ of about 78°, an angle $\theta_6$ of about 70° and an angle $\theta_7$ of about 80°, respectively. Sleeve 206 is rotated in the clockwise direction so that the developer is transported from agitator 198 to a developing position 216 by carrying the developer on the surface of sleeve 206. A hopper 218 is provided above agitator 198. This hopper 218 accommodates toner particles and replenishes the toner through a toner outlet 220. In hopper 218, there are disposed an agitator 222 and a replenishing roller 224 above outlet 220. The toner stored in hopper 218 is stirred by agitator 222 and replenished by roller 224 through outlet 220 according to the detection of sensor 200. Thus, the toner replenished by roller 224 is mixed with carrier particles by agitator 198 so that the toner particles have a sufficient charge to achieve the developing operation.

Magnetic rollers 166 and 204 are capable of rotational displacement by a rotational angle of about 25°, respectively. The developer layer, i.e, the magnetic brush, is formed on or removed from the surface of sleeve 186 or 206 in accordance with the rotational displacement of magnetic rollers 166 and 204. More specifically, when first developing unit 148 is driven, magnetic roller 166 in first developing unit 148 assumes a position as shown in FIG. 6, in which magnetic pole 174 faces developing position 180 and doctor 156 faces a portion of magnetic roller 166 between magnetic poles 170 and 172. In this condition, the magnetic brush of the developer is formed on the surface of sleeve 168 and magnetic roller 204 in second developing unit 150 is left in a status as shown in FIG. 6. When second developing unit 150 is driven, magnetic roller 166 in first developing unit 148 is displaced by about 25° in the counterclockwise direction as shown in FIG. 7, in which magnetic pole 170 faces doctor 156. At the same time, magnetic roller 204 in second developing unit 150 is displaced by about 25° in the counterclockwise direction as shown in FIG. 7, in which doctor 192 is located between magnetic poles 208 and 210. Thus, the magnetic brush of the developer is formed on the surface of sleeve 206.

As described above, when magnetic pole 170 or 208 is opposed to doctor 156 or 192, respectively, the formation of the magnetic brush is prevented. The reason why this operation is achieved by doctors 156 and 192 and magnetic poles 170 and 208 is due to externally diverging magnetic lines of force which are established from the magnetic poles because doctor 156 or 192 is made of nonmagnetic materials. As a result, there is provided low magnetic forces for attracting the developer at the position of the magnetic poles, so that doctor 156 or 192 may prohibit the passing of the developer with the rotation of sleeve 168 or 206. FIG. 6 shows the operational conditions of developing device 124 wherein first developing unit 148 is activated. Also, FIG. 7 shows the operational conditions of developing device 124 wherein second developing unit 150 is activated. In these drawings, agitators 248, 186, 188, 198 and 222, replenishing rollers 190 and 224 and sleeves 168 and 206 are rotated in the direction of the arrow as shown in FIGS. 6 and 7.

Figure 8:
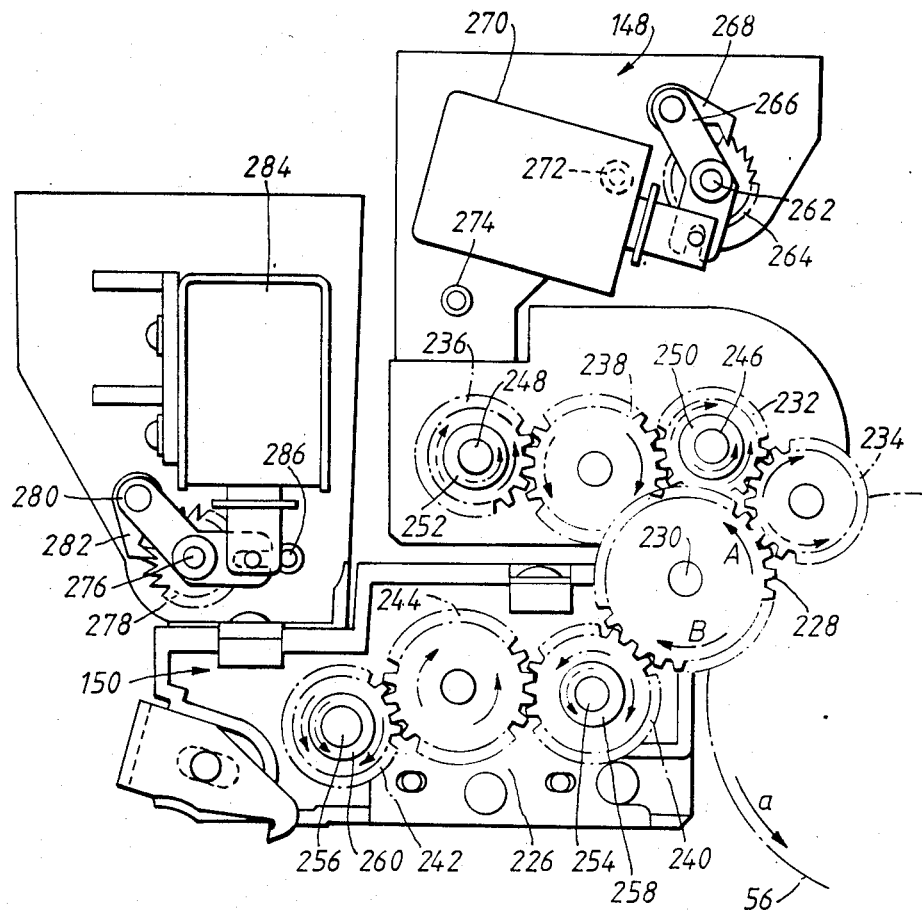
FIG. 8 is a side view of the developing devices.

Referring now to FIG. 8, there is shown a driving mechanism 226 for selectively driving first and second developing units 148 and 150. This driving mechanism 226 is provided with a driving gear 228 driven by a driving shaft 230 connected to a reversible motor (not shown). The drive force of drive gear 228 is transmitted to a driven gear 232 by a gear 234 in mesh with driving gear 228 and to a driven gear 236 by a gear 238 in mesh with driven gear 232. The drive force of drive gear 228 is also transmitted to a driven gear 240 which is in mesh with drive gear 228 and to a driven gear 242 by a gear 244 in mesh with driven gear 240. When drive gear 228 is rotated forwardly, i.e., in the direction of a solid arrow A in FIG. 8, gears 232, 234, 236 and 238 and gears 240, 242 and 244 are driven in the direction of the solid arrows as shown in FIG. 8. On the other hand, these gears are driven in the direction of the broken arrows when drive gear 228 is rotated reversely, i.e., in the direction of a broken arrow B in FIG. 8. Driven gears 232 and 236 are mounted on driving shafts 246 and 248 through unidirectional clutches 250 and 252. These unidirectional clutches 250 and 252 transmit the drive force of gear 234 or 238 to driving shaft 246 or 248 on condition that driving gear 228 is rotated in the direction of arrow A. Driving shafts 246 and 248 are coupled to sleeve 168 and agitator 160, respectively. Consequently, sleeve 168 and agitator 160 of first developing unit 148 are driven when driving gear 228 is rotated in the direction of arrow A. Similarly, driven gears 240 and 242 are mounted on driving shafts 254 and 256 through unidirectional clutches 258 and 260. These unidirectional clutches 258 and 260 transmit the drive force of gear 228 or 244 to driving shaft 254 or 256 on condition that driving gear 228 is rotated in the direction of arrow B. Driving shafts 254 and 256 are coupled to sleeve 206 and agitator 198, respectively. Therefore, sleeve 206 and agitator 198 of second developing unit 150 are driven when driving gear 228 is rotated in the direction of arrow B.

Agitator 186 is coupled to a driving shaft 262 on which a ratchet wheel 264 is attached. An arm 266 having ratchet pawl 268 on one end is pivoted upon driving shaft 262. A solenoid 270 is coupled to the other end of arm 266 so that the reciprocation of solenoid 270 rotates arm 266 about shaft 262. By the reciprocative rotation of arm 266, ratchet pawl 268 is latched on ratchet wheel 264. Thus, ratchet wheel 264 is intermittently driven at a predetermined pitch by ratchet pawl 268 mounted on arm 266, and the drive force of ratchet wheel 264 is transmitted to shaft 262 so as to rotate agitator 186. The drive force of ratchet wheel 264 is also transmitted to driving shafts 272 and 274 by a suitable member (not shown). On these driving shafts 272 and 274, agitator 188 and toner replenishing roller 190 are mounted, respectively. Therefore, agitator 188 and roller 190 are also driven by ratchet wheel 264. Similarly, agitator 222 is coupled to a driving shaft 276 on which a ratchet wheel 278 is mounted. An arm 280 having ratchet pawl 282 on one end thereof is pivoted on driving shaft 276. A solenoid 284 is coupled to the other end of arm 280 so that the reciprocation of solenoid 284 is transformed into the rotational movement of arm 280. By this movement of arm 280, ratchet pawl 282 is latched on ratchet wheel 278. Therefore, ratchet wheel 278 is intermittently rotated at a predetermined pitch by ratchet wheel 278 mounted on arm 280. The drive force is transmitted to shaft 276 to rotate agitator 222 and is also transmitted to a driving shaft 286 to rotate replenishing roller 224 by a suitable coupling member (not shown). As a result, agitator 222 and roller 224 are driven by ratchet wheel 278.

Figure 9:
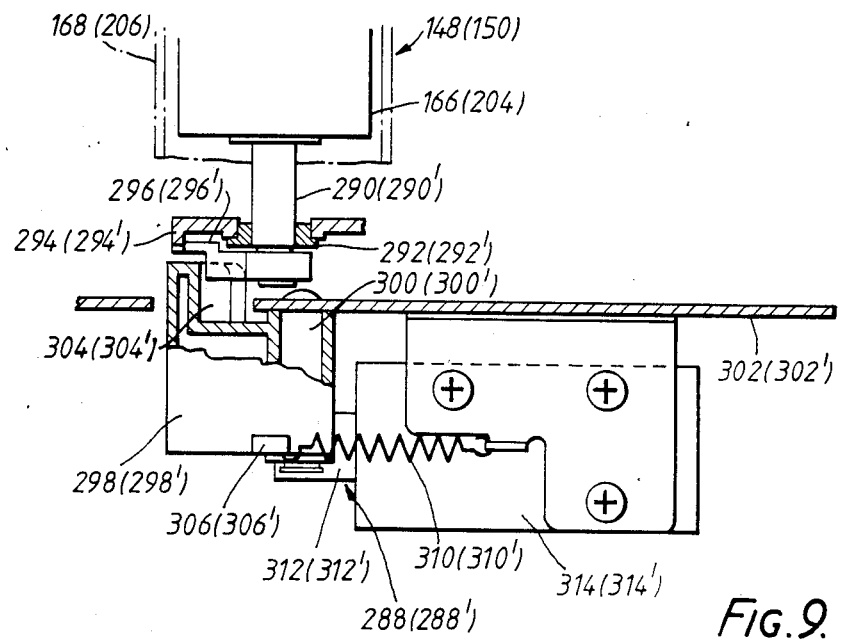
FIG. 9 is a plan view of a drive mechanism for the developing device.
Figure 10:
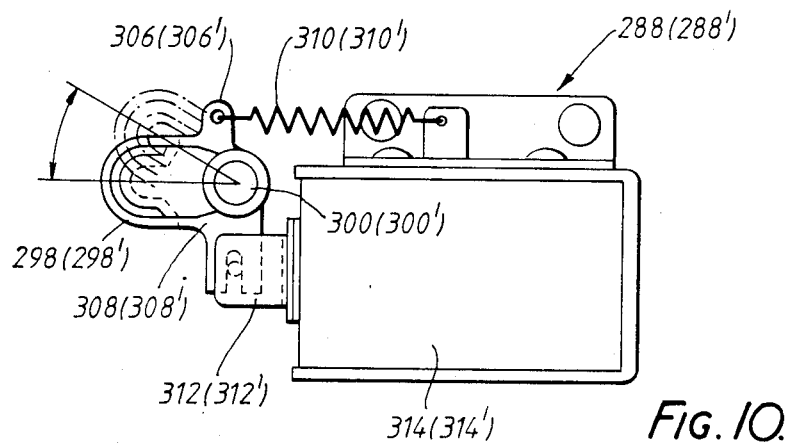
FIG. 10 is a side view of the drive mechanism for the developing device.

Referring now to FIGS. 9 and 10, there is shown a driving device 288 for driving magnetic roller 166 so as to selectively activate developing units 148 and 150. First developing unit 148 and driving device 288 for driving magnetic roller 166 are shown in FIGS. 9 and 10. The same components are found in second developing unit 150, and are referred to by respective primed numbers. FIG. 9 is a plan view of driving device 288 (288′) and FIG. 10 is a side view of driving device 288 (288′). A driving shaft 290 (290′) is attached to magnetic roller 166 or 204, respectively. This shaft 290 (290′) is supported by a bearing 292 (292′) mounted on a frame 294 (294′). A lever 296 (296′) is fixed to the end of shaft 290 (290′). An arm 298 (298′) is pivoted on a shaft 300 (300′) supported on a frame 302 (302′). Arm 298 (298′) is provided with a groove 304 (304′) so that one end of lever 296 (296′) is engaged with arm 298 (298′). Arm 298 (298′) is also provided with projections 306 and 308 (306′ and 308′) opposed each other through shaft 300 (300′). Projection 306 (306′) is coupled to a tensile spring 310 (310′) and projection 308 (308′) is coupled to a plunger 312 (312′) of a solenoid 314 (314′). Thus, arm 298 (298′) ordinarily holds lever 296 (296′) at a position shown with a dotted line in FIG. 10 owing to the biasing force of spring 310 (310′), whereby magnetic roller 166 or 204 is rotated so that magnetic pole 170 or 208 is opposed to doctor 156 or 192. In this condition, the magnetic brush of the developer is not formed on the surface of sleeve 168 or 206. On the other hand, plunger 312 (312′) rotates arm 298 (298′) against the biasing force of spring 310 (310′) when solenoid 314 (314′) is energized. As a result, arm 298 (298′) holds lever 296 (296′) at a displaced position shown with a solid line in FIG. 10, whereby magnetic roller 166 or 204 is rotated so that doctor 156 or 192 is located between magnetic poles 170 and 172 or 208 and 210. In this condition, the magnetic brush of the developer is formed on the surface of sleeve 168 or 206 in accordance with the rotation of sleeve 168 or 206.

PRINTING PROCESS

Figure 11:
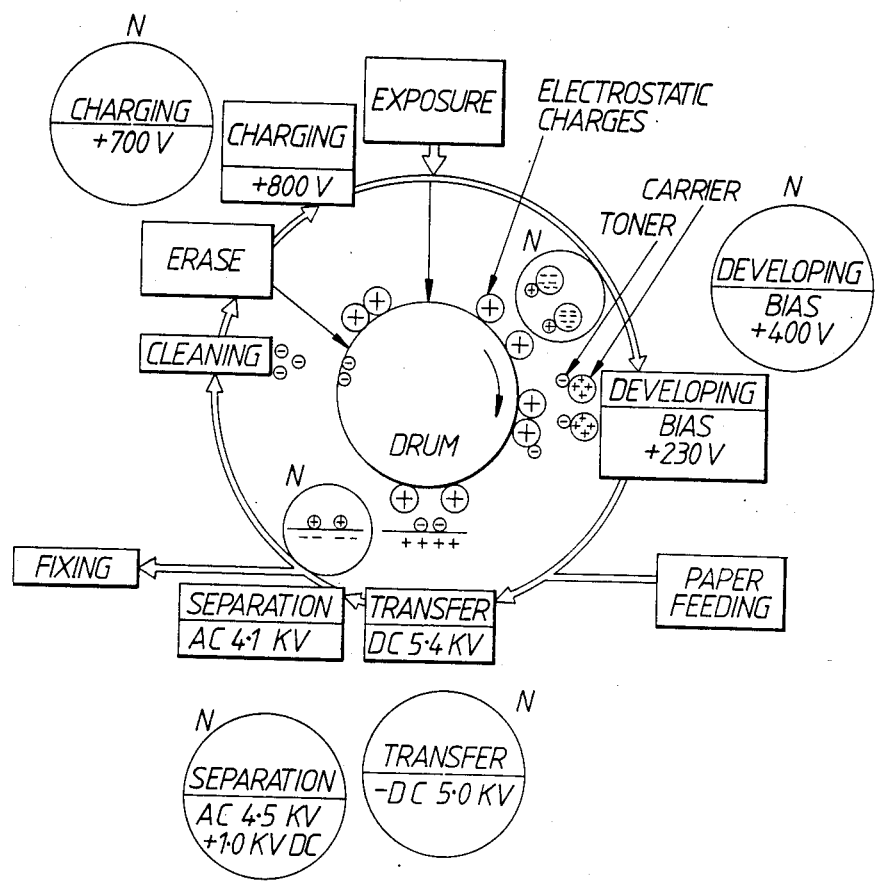
FIG. 11 is a view for explaining the image forming principle of the printer unit.

FIG. 11 shows a printing process of printer unit 12. In FIG. 11, bold arrows represent a cycle of the electrophotography process including exposure, development, transfer, separation, cleaning and erase. Also, the steps shown enclosed in rectangles designate the operation for reproduction of a positive copy from a positive original (hereinafter referred to as P-P development) and steps shown enclosed in circles designate the operation for reproduction of a positive copy from a negative original image (hereinafter referred to as N-P development).

Figure 12A:
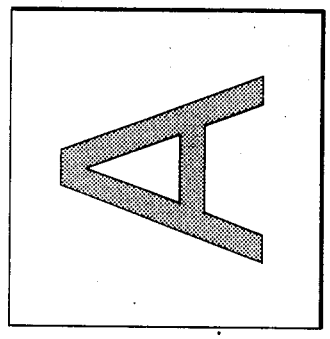
FIG. 12A and B is a view for illustrating a positive original image and a negative original image.

For the P-P development, a P-P selection key, to be mentioned later, an operational panel 16 is depressed, whereby developing device 124 operates to render only first developing unit 148 operative. Next, charger 122 (FIG. 5) positively charges the photoreceptor of drum 56 up to a surface potential of about +800 V. Then, the light image scanned by scanning unit 28 is led through exposure slit 120 to expose to the charged surface of drum 56 in accordance with the scanning of rotatable mirror 48. Light to be projected onto the surface of drum 56 results from the light passed through microfilm M. For example, as shown in FIG. 12(a), this light is other than the area constituting the character "A". Thus, the surface potential on the surface of drum 56 remains only for the area constituting the character "A" by the light exposure. Consequently, an electrostatic latent image corresponding to the character "A" on microfilm M is formed on the surface of drum 56. Meanwhile, a bias voltage of about +230 V is applied between sleeve 168 and drum 56 which is earthed so that a voltage difference of about +570 V occurs (see FIG. 6). Also, the toner particles and carrier particles comprised in the developer are triboelectrically charged by the mixing operation of agitator 160, so that the toner particles become negatively charged and the carrier particles become positively charged. The toner particles have a sufficient charge to be attracted to the surface of drum 56 by the voltage difference of +570 V and coulomb force between the toner particles and the latent image. The toner particles transported with the carrier particles along the outer periphery of sleeve 168 are attracted onto the surface of drum 56 as they come to face the latent image in accordance with the rotation of drum 56 and sleeve 168. Paper P fed from cassette 22 is guided to transferring station 128, wherein the developed image may be transferred to paper P. At this time, a voltage of DC 5.4 kV is applied to charger 130 to attract the developed image to paper P. Subsequently, paper P is separated from the surface of drum 56 by charger 132 driven at AC 4.1 kV. Next, copy sheet P carrying the positive copy image is transported to fixing device 136, whereby the copy image is fixed on sheet P. Thus, copy sheet P is discharged into tray 60 by discharge rollers 138. After the transferring operation, drum 56 faces cleaner 140 and erase lamp 146 in succession so as to remove residual toner particles and charges.

Figure 12B:
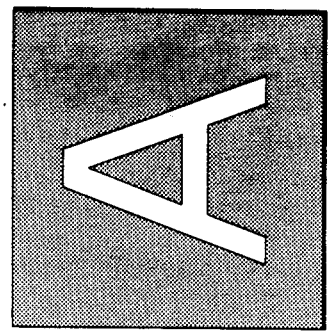

For the N-P development, a N-P selection key, to be described later, is depressed, whereby second developing unit 150 becomes operative. First, charger 122 positively charges the photoreceptor of drum 56 up to a surface potential of about +700 V. Then, the light image scanned by scanning unit 28 is led through exposure slit 120 to expose to the charged surface of drum 56 according to the rotation of mirror 48. Light to be irradiated onto the surface of drum 56 results from the light passed through a portion of microfilm M constituting a character "A" as shown in FIG. 12(b). Thus, the surface potential on the surface of drum 56 is attentuated for the area corresponding to the character "A". Consequently, an electrostatic latent image of a negative type is formed on drum 56. A bias voltage of about +400 V is applied between sleeve 206 and drum 56 which is earthed, so that a voltage difference of about +300 V is established (see FIG. 7). This voltage difference of +300V is higher than the attenuated surface potential on drum 56. This means that the area of drum 56 corresponding to the character "A" is held at a negative potential with respect to sleeve 206. Meanwhile, the toner particles and carrier particles mixed into the developer are triboelectrically charged by the mixing operation of agitator 198, so that the toner particles become positively charged and the carrier particles become negatively charged. The toner particles have a sufficient charge to be attracted to the surface of drum 56, where the area for the character "A" is held at the negative potential to attract positively charged toner particles. Thus, the reverse development is performed. The developed image is transferred to copy sheet P by charger 130. In this condition, a voltage of DC −5 kV is applied to charger 130 so as to attract positive charged toner particles to copy sheet P. After that, copy sheet P is separated from drum 56 by charger 132 driven by a voltage of AC 4.5 kV and +DC 1.5 kV so as to positively shift the potential of charger 132 and to enhance the sheet separation operation. Thus, copy sheet P is discharged into tray 60 and drum 56 returns to its initial status in the same manner as in the case of the P-P development.

The P-P development, generally called "direct developing", and the N-P development, generally called "reverse developing", are performed by using different kinds of toner. The toner comprises a binder of thermoplastic resins, a colorant and additives. The polarity of triboelectrical charge generated on the toner depends on the kind of these components used for the toner and the carrier. In this embodiment, negatively chargeable toner particles are used for first developing unit 148 and positively chargeable toner particles are used for second developing unit 150. Therefore, the heating temperature and pressure of fixing device 136 may be established for each developing operation in accordance with the kind of toner to obtain an optimum fixing operation.

Also, the selecting operation for the P-P development and N-P development is not permitted during a developing operation. Moreover, drum 56 is rotated one rotation without any operations after switching between the P-P development and N-P development to avoid a positive or negative hysteresis on the photoreceptor of drum 56.

Operational Panel

Figure 13:
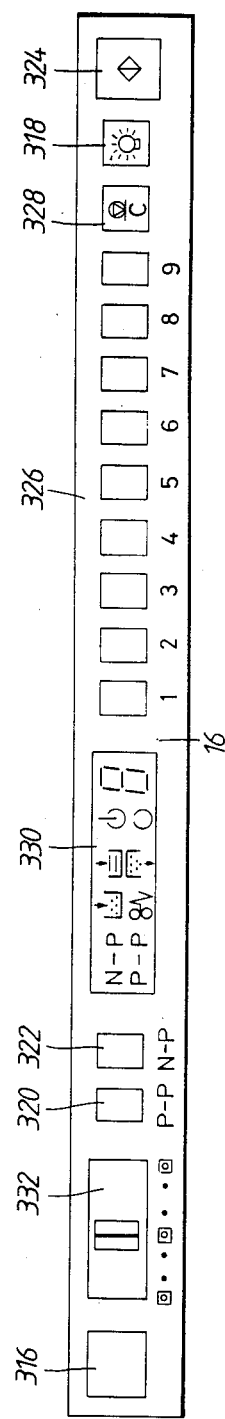
FIG. 13 is a plan view of an operation panel of the microfilm reader printer.

Referring now to FIG. 13, operational panel 16 will be explained in detail. This panel 16 is provided with a main switch 316 for supplying electric power to the microfilm reader printer and a stand-by key 318 for deenergizing light source 38. When main switch 316 is operated, light source 38 is lit and fixing device 136 works so as to initiate the operation for projecting and printing the microfilm image. In this condition, light source 38 is extinguished when stand-by key 318 is operated in order to prevent rising temperatures in printer unit 12 and further to increase the lifetime of light source 38. Further, there are provided a P-P selection key 320 for activating first developing unit 168 and a N-P selection key 322 for activating second developing unit 150 on panel 16. Also, there are provided a print key 324 for initiating printing operation, a digital keyboard 326 for establishing copy quantity, a clear key 328 for changing the copy quantity established by digital keyboard 326, a display 330 for displaying selected developing operation, toner replenishment, sheet feeding, sheet jamming, copying operation, stand-by status and copy quantity and a knob 332 for establishing the image density of the copy.

CONTROL DEVICE

Figure 14:
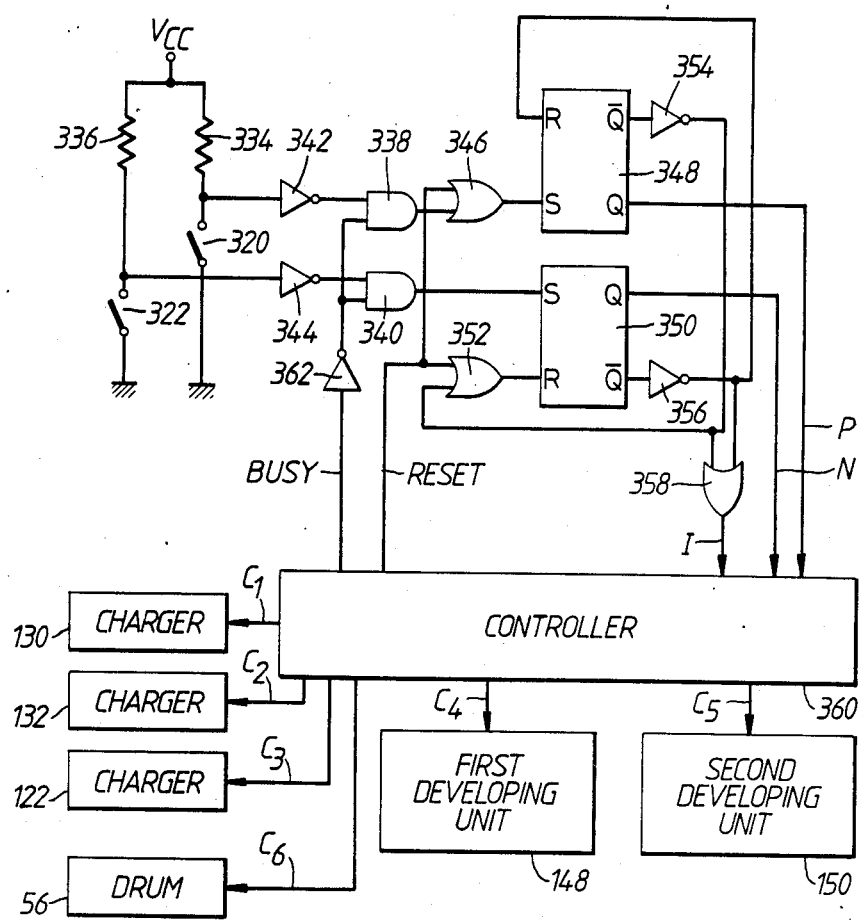
FIG. 14 is a schematic block diagram of a control device of the microfilm reader printer.

Referring now to FIG. 14, a control device for selectively driving one of developing units 148 and 150 is disclosed. Selection keys 320 and 322 are pulled up to a potential Vcc of a power supply (not shown) through respective resistors 334 and 336 and are connected to AND gates 338 and 340 through inverters 342 and 344. AND gate 338 is connected to an OR gate 346, and this OR gate 346 is connected to a latch 348. AND gate 340 is connected to a latch 350. The inverted output terminal $\overline{Q}$ of latch 348 is connected to an OR gate 352 through an inverter 354. OR gate 352 is connected to the reset terminal R of latch 350. Also, the inverted output terminal $\overline{Q}$ of latch 350 is connected to the reset terminal R of latch 348 through an inverter 356. Inverters 354 and 356 are connected to an OR gate 358. Control signals N and P for designating the selected developing unit are provided from output terminals $\overline{Q}$ of latches 348 and 350, respectively. These control signals N and P are input to a controller 360 which may comprise a microcomputer and a memory unit. OR gate 358 is connected to controller 360 and a control signal I for establishing that one of the developing units is activated, is input to controller 360. Control signals BUSY and RESET are output from controller 360. The signal BUSY is generated to represent that printer unit 12 is at work for the printing operation. The signal RESET is provided when the printer unit 12 is initialized or main switch 316 of the apparatus is turned on. The signal BUSY is supplied to AND gates 338 and 340 through an inverter 362. The signal RESET is supplied to OR gates 346 and 352. Controller 360 outputs control signals $C_1$–$C_6$. Control signals $C_1$–$C_3$ are used for switching the operation of chargers 122, 130 and 132 in response to signals N and P. Namely, when first developing unit 148 is designated, these signals $C_1$–$C_3$ reach a high level so that chargers 122, 130 and 132 are connected to respective power supplies suitable for the P-P development. On the other hand, when second developing unit 150 is designated, signals $C_1$–$C_3$ become a low level so that chargers 122, 130 and 132 are energized to achieve the N-P development. Signals $C_4$ and $C_5$ are used for designating first and second developing units 148 and 150, respectively, so that magnetic rollers 166 and 204 are turned to predetermined positions (FIGS. 9 and 10). The reversible motor (not shown) for driving developing device 124 starts the rotating operation in the predetermined direction (FIG. 8) and the bias voltage suitable for the selected development is applied. It may thus be appreciated that each of control signals $C_4$ and $C_5$ contain a plurality of signals for actuating the first and second image forming means for controlling driving shaft 230, solenoids 270, 284 and magnetic rollers 166 and 204. Control signal $C_6$ is used for driving the motor to rotate drum 56.

With this circuit, an output signal of inverter 342 is provided to AND gate 338 according to the operation of key 320. In this case, the signal BUSY is to output from controller 360 at this time since printer unit 12 is not at work. As a result, AND gate 338 provides a high level signal to latch 348 through OR gate 346 so that the signal P is output. Controller 360 outputs control signals $C_1$–$C_5$ such that first developing unit 148 is activated and the P-P development is executed in response to the signal P. At the same time, the inverted signal of inverter 356 is supplied to the reset terminal of latch 350 through OR gate 352. Thus, latch 350 is reset by the output signal from latch 348.

On the other hand, an output signal of AND gate 340 is generated when key 322 is operated. Latch 350 is set by the output signal of AND gate 340 so that the signal N is output. Controller 360 outputs control signals $C_1$–$C_5$ such that second developing unit 150 is activated and the N-P development is executed in response to the signal N. At the same time, latch 348 is reset by the output sginal from latch 350. The reset signals from latches 348 and 350 are input into OR gate 358. Thus, OR gate 358 provides the signal I to controller 360. In accordance with the signal I, controller 360 provides output $C_6$ to rotate the drum 56 for one rotation.

The circuitry utilized to generate the N and P control signals, especially, keys 320, 322 and latches 348 and 350 may be termed control signal providing means for selecting one of the first and second image forming means. These control signals are inhibited in the presence of the BUSY signal during the image forming operation.

The reset signal RESET is used for preferentially setting latch 348 for the P-P development.

According to this control device, only either signal P or N corresponding to the first depressed key is provided even if both keys 320 and 322 are operated. Further, operations for keys 320 and 322 are not permitted during the printing operation.

OPERATION

Now, the operation of the overall microfilm reader printer mentioned above will be briefly described.

For projecting the microfilm image onto the screen 14, the microfilm is positioned between transparent plates 32 and 34. Next, light source 38 for projecting the microfilm image is turned on by operating main switch 316 provided on operation panel 16. Thus, the microfilm image is projected onto screen 14 in an enlarged size. The focus adjustment is accomplished by turning vane-like members 88 of focus adjustment member 86. The positioning of the projected image on screen 14 is established by moving retainer 18 carrying the microfilm in the longitudinal and transversal directions. Also, the projected image on screen 14 is readily rotated, if necessary, by turning gear 78 so as to rotate prism 82.

For printing the enlarged size projected image, stand-by key 318 provided on panel 16 may be operated to turn off light source 38. Then, rotatable mirror 48 is displaced in the perpendicular direction to the plain in FIG. 2 by operating a key or knob (not shown), thereby mirror 48 is positioned for printing. When the heater of fixing device 136 has been warmed up to a predetermined temperature and a ready-to-print display is provided on display 330, stand-by key 318 may be operated to start the printing operation. Then, either selection key 320 or 322 is operated in conforming with the type of image recorded on the microfilm. The copy quantity may be established by operating digital keyboard 326 and the operation for printing the copy image is performed by depressing the print key 324. Now, the projected light from lens holder 40 is scanned by mirror 48 driven in synchronization with the rotation of drum 56 and is diverted onto the surface of drum 56 through exposure slit 20. Meanwhile, the surface of drum 56 is previously charged by charger 122 in accordance with the type of development, and an electrostatic latent image is formed on drum 56 according to the scanning exposure. When the image on drum 56 rotates adjacent developing device 124, a positive toner image is formed by first developing unit 148 if the latent image is based on a positive microfilm image, and by a second developing unit 150 if the latent image is based on a negative microfilm image. The developed image is transferred onto copy sheet P by charger 130 in the manner depending on the type of development. Copy sheet P is then separated from drum 56 by charger 132 in accordance with the type of development. Copy sheet P is then fed to fixing device 136 by conveyor 134, where the transferred image is fixed onto copy sheet P by fusion. Sheet P is discharged onto tray 60 by rollers 138. The residual toner on drum 56 is removed by cleaner 140 and the residual charge is erased by lamp 146 so as to be ready for the next printing cycle.

As has been described in the foregoing explanation, first developing device for developing a positive copy image from a positive microfilm image and second developing device for developing a positive copy image from a negative microfilm image are provided in the microfilm reader printer so that the copy image may be readily and quickly obtained from both types of microfilm.

The above embodiments are given only for the purpose of illustrating the invention. Numerous modifications and variations of the present invention are possible in light of the above teachings. It is, therefore, to be understood that within the scope of the appended claims, the present invention may be practiced otherwise than as specifically described herein.

What is claimed is:

1. An image forming apparatus comprising:
   means for forming an electrostatic latent image with a first polarity on an image carrier;
   first developing means for depositing a first developer charged with a second polarity, different from the first polarity, onto the electrostatic latent image in order to perform direct developing;
   second developing means for depositing a second developer charged with the first polarity onto the electrostatic latent image in order to perform reverse developing;
   means for selectively energizing one of said first and second developing means so as to perform the selected developing;
   first biasing means for establishing a first biased voltage between said first developing means and the image carrier to perform the direct developing by said first developing means;
   second biasing means for establishing a second biased voltage, different from the first biased voltage, between said second developing means and the image carrier to perform the reverse developing by said second developing means; and
   means for transferring the developer image formed on the image carrier by one of said first and second developing means onto a paper, said transferring means applying an electric discharge having a polarity of the first or second polarity respectively according to said energized first or second developing means, whereby the paper comes into contact with the surface of the image carrier.

2. An image forming apparatus as claimed in claim 1, further comprising:
   means for separating the paper which carries the developer image transferred by said transferring means from the image carrier by applying an electric discharge, the electric discharge being provided by an AC voltage biased by a predetermined voltage with the first polarity when the reverse developing is performed.

3. An apparatus for reading and printing microfilm images comprising:
   means for supporting a stationary microfilm having an original image thereon;
   means for illuminating the stationary microfilm supported by said supporting means;
   means for projecting the original image of the microfilm illuminated by said illuminating means onto a screen;
   means for exposing the original image of the microfilm illuminated by said iluminating means onto a photoreceptor having a charged surface with a first polarity to form an electrostatic image on the charged surface according to the original image, said exposing means being movable for optically scanning;
   first developing means for depositing a first developer charged with a second polarity, different from the first polarity, onto the electrostatic latent image in order to perform direct developing;
   second developing means for depositing a second developer charged with the first polarity onto the electrostatic latent image in order to perform reverse developing;
   means for selectively energizing one of said first and second developing means so as to perform the selected developing;
   first biasing means for establishing a first biased voltage between said first developing means and the photoreceptor to perform the direct developing by said first developing means;
   second biasing means for establishing a second biased voltage, different from the first biased voltage, between said second developing means and the photoreceptor to perform the reverse developing by said second developing means; and
   means for transferring the developer image formed on the photoreceptor by one of said first and second developing means onto a paper, said transferring means applying an electric discharge having a polarity of the first or second polarity according to said energized first and second developing means, whereby the paper comes into contact with the surface of the photoreceptor.

4. An image forming apparatus as claimed in claim 3, further comprising:
   means for separating the paper which carries the developer image transferred by said transferring means from the photoreceptor by applying an electric discharge, the electric discharge being provided by an AC voltage biased by a predetermined voltage with the first polarity when the reverse developing is performed.

* * * * *